(12) United States Patent
Schmitz et al.

(10) Patent No.: US 6,353,884 B1
(45) Date of Patent: Mar. 5, 2002

(54) SYSTEM FOR DESCRIBING AND STORING DESCRIPTIONS OF HIERACHICAL STRUCTURES USING HARDWARE DEFINITION FILES TO SPECIFY PERFORMANCE, CHARACTERISTICS, PART NUMBER AND NAME OF HARDWARE COMPONENTS

(75) Inventors: Christoph Schmitz, Tomball; Manoj J. Varghese, Cypress; Keith L. Kelley, Houston; Charles A. Bartlett, Woodlands, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/126,023

(22) Filed: Jul. 29, 1998

(51) Int. Cl.[7] .......................... G06F 15/177; G06F 15/76
(52) U.S. Cl. ............................... 713/1; 710/10; 710/104; 713/100
(58) Field of Search ............................ 710/10, 72, 104, 710/129; 712/36; 713/100, 1; 709/220

(56) References Cited

U.S. PATENT DOCUMENTS

| | | | |
|---|---|---|---|
| 5,072,367 A | * 12/1991 | Clayton et al. | 395/600 |
| 5,428,791 A | * 6/1995 | Andrew et al. | 395/700 |
| 5,515,524 A | * 5/1996 | Lynch et al. | 395/500 |
| 5,546,595 A | 8/1996 | Norman et al. | 395/800 |
| 5,603,043 A | 2/1997 | Taylor et al. | 395/800 |
| 5,640,595 A | 6/1997 | Baugher et al. | 395/830 |
| 5,668,995 A | * 9/1997 | Bhat | 395/674 |
| 5,787,246 A | 7/1998 | Lichtman et al. | 395/200.5 |
| 5,809,329 A | 9/1998 | Lichtman et al. | 395/828 |
| 5,825,361 A | 10/1998 | Rubin et al. | 345/349 |
| 5,838,907 A | 11/1998 | Hansen | 395/200.5 |
| 5,850,539 A | 12/1998 | Cook et al. | 395/500 |
| 5,892,681 A | 5/1999 | McDermith et al. | 364/488 |
| 5,960,181 A | * 9/1999 | Sanadidi et al. | 395/500.44 |
| 6,016,496 A | 1/2000 | Roberson | 707/103 |
| 6,052,524 A | * 4/2000 | Pauna | 395/500.43 |

OTHER PUBLICATIONS

Bonnie Carter et al., "Oracle System Sizer™ Getting Started for Compaq Windows NT Systems, Rel. 2.3.1," 1996, pp. 1:2–1:5.

* cited by examiner

Primary Examiner—Thomas Lee
Assistant Examiner—Thuan Du
(74) Attorney, Agent, or Firm—Akin, Gump, Strauss, Hauer & Feld, LLP

(57) ABSTRACT

A method implemented according to the invention allows a user to specify with particularity hierarchical structures such as computer hardware and peripheral equipment in such a way that it simplifies the storing, retrieving, and manipulation of the information.

17 Claims, 22 Drawing Sheets

```
    %PL1600-SLOTS %
    TYPE STRUCT;
    INTEGER PCIHotPlugSlots 0;
    INTEGER PCISlots 2;
 5  INTEGER SharedSlots 4;
    INTEGER EISASlots 0;

%PL1600R-SERVFAM%
    TYPE STRUCT;
10  STRING Name "Proliant 1600";
    STRING Description "Featuring a 266 MHz Pentium II
    processor with 512KB of integrated Level-2 cache, the
    ProLiant 1600 is the first workgroup server
    to combine dual processing capability with hot plug
15  drives for high-performance and maximum uptime, making it
    the perfect choice for remote offices.";
    INTERGER MaximumProcessors 2;
    INTEGER MaximumMemory 512;
    INCLUDE ExpansionSlots "PL1600-SLOTS";
20  INCLUDE Availability "PL1600R-AVAILABILITY ";

%PL1600-MEM-1%
    TYPE KNAPSACK ORDER (Capacity) OPTIMIZE (-1)(Price)SIZE(1.6)
    FROM "MEM-6-64-FREE" IN (1,1)
25  "MEM-6-64" IN (1,6), "MEM-6-128" IN (1,6), "MEM-6-256" IN (1,6),
    "MEM-6-512" IN (1,6);

%PL1600-CTL-2%
    TYPE KNAPSACK ORDER (Price) XADVANCE (UsedSlots)
30  OPTIMIZE (1,1)(ChannelQty,SharedChannelQty) SIZE (1,5)
    FROM "SMART-1-P-FREE" IN (1,1), "SMART-2-P" IN (1,5)
    "SMART-2-P-PAIR" IN (1,5);

%PL1600-PROC-1%
35   TYPE SET SIZE(1,2) FROM "PROC-7-266-512 IN (1,1),
    "PL1600-PKIT-7-266-512" IN (2,2)
    ATTRIBUTE/INVISIBLE;

Boards.hdf

%RSOBOARD-F1%
TYPE STRUCT ATTRIBUTE /INVISIBLE ;
VALUE PartPrice Price.PN304117B21 GLOBAL ATTRIBUTE /VIRTUAL ;
VALUE Price Price.PN304117B21 GLOBAL ATTRIBUTE /VIRTUAL ;
VALUE PartNo PartNo.PN304117B21 GLOBAL ;
VALUE ExternalName ExternalName.PN304117B21 GLOBAL ;

FIG. 5

Conversions.hdf

%PL6000-TOWER2RACK%
TYPE STRUCT ATTRIBUTE /INVISIBLE ;
VALUE Price Price.PN273316B21 GLOBAL ATTRIBUTE /VIRTUAL ;
VALUE PartPrice Price.PN273316B21 GLOBAL ATTRIBUTE /VIRTUAL ;
VALUE PartNo PartNo.PN273316B21 GLOBAL ATTRIBUTE /INVISIBLE ;
VALUE ExternalName ExternalName.PN273316B21 GLOBAL ATTRIBUTE
/ICON:17;

FIG. 7

Description.hdf

%DESCRIPTION%
TYPE STRUCT;
STRING PN234453001 "Fibre Channel Storage Hub 7" ATTRIBUTE /INVISIBLE
;
@This is mapping of US1 part numbers into names. The part numbers are denormalized (without - and PN as a Prefix).
STRING PN283697001 "ProLiant 1200/1600/2500-521K Redundant Power Supply" ATTRIBUTE /INVISIBLE;
STRING PN273315B21 "ProLiant 5000/6000 6/200-512K Processor Option Kit " ATTRIBUTE /INVISIBLE;
STRING PN289726B21 "ProLiant 5000/600 6/200 - 1024K Processor Option Kit " ATTRIBUTE /INVISIBLE;
STRING PN296372B21 "ProLiant 6500/7000 6/200-1024k Processor Option Kit " ATTRIBUTE /INVISIBLE;

FIG. 10

Controllers.hdf

%SMART-2SL%
@Naming convection: simple name.
TYPE STRUCT ATTRIBUTE /INVISIBLE ;
INTEGER DriveCages 0 ATTRIBUTE /INVISIBLE ;
@After configuration, this field is filled with a set of drive cages.
INTEGER ExternalChannel 1 ATTRIBUTE /INVISIBLE ;
@Number of maximum external channels.
INTEGER InternalChannel 0 ATTRIBUTE /INVISIBLE ;
@Number of maximum internal channels.
INTEGER LogicalControllers 1 ATTRIBUTE /INVISIBLE ;
@This record stands for how many logical controllers (mostly 1, in the case of HUB7, we have 6).
INTEGER PhysicalControllers 1 ATTRIBUTE /INVISIBLE ;
@How many physical controllers are involved in this record (mostly 1, in the case of redundant controller pairs, 2).
INTEGER TechIndex 2 ATTRIBUTE /INVISIBLE ;
@This tech index groups controllers together. Currently:
@ TechIndex
@ 0x1 - Redundant
@ 0x2 - SMART technology
@ 0x4 - SCSI technology
@ 0x8 - Fiber technology
@ 0x10 - SMART 3100ES
INTEGER Channel 1 ATTRIBUTE /INVISIBLE ;
@Number of logical channels that are available (controller redundancy: number of channels/2)
INTEGER SharedChannel 0 ATTRIBUTE /INVISIBLE ;
@Number of logical channels that can be used for RSO-U1 (controller redundancy: number of channels/2)
INTEGER FibreChannel 0 ATTRIBUTE /INVISIBLE ;
@Number of logical channels that can be used for fiber storage systems (controller redundancy: number of channels/2)
INTEGER Slot 1 ATTRIBUTE /INVISIBLE ;
@This record consumes how many PCI slots.
VALUE PartPrice Price.PN242776B21 GLOBAL ATTRIBUTE /VIRTUAL ;
VALUE Price PartPrice+DriveCages.Price ATTRIBUTE /VIRTUAL ;
VALUE PartNo PartNo.PN242776B21 GLOBAL ATTRIBUTE /INVISIBLE ;
VALUE ExternalName ExternalName.PN242776B21 GLOBAL ATTRIBUTE /ICON:9 /PROMOTED ;

*FIG. 6*

DCCtlTab.hdf

%CTLTAB-SMART-1-0%
@Naming ConvectionCTLTAB - SMART/SCSI - technr - freebies
TYPE KNAPSACK ORDER (Price) XADVANCE (Slot) OPTIMIZE
(1,1,1)(Channel,SharedChannel,FibreChannel) SIZE (1,8) FROM
@Order controllers according to price. Place combinations that use the same PCI slots in one column. Count the number of channels, shared channels, fibre channels. Build a table with 8 columns.
"SMART-2SL" IN (1,1),
@Smart SL allowed only in first slot.
"SMART-2DH " IN (1,8),
@Smart 2DH allowed in all 8 slots.
"SMART-2DH-PAIR " IN (1,8),
@Smart 2SL redundant pair allowed everywhere.
"SMART-2SL-PAIR " IN (1,1),
@Smart 2SL redundant pair allowed only in first slot.
"FIBER-HOST-CONTROLLER " IN (1,8),
@Fiber ctl everywhere.
"FIBER-HOST-CONTROLLER-HUB-7 " IN (1,8);
@Fiber Host controller with HUB-7 attached to it everywhere.

%DCTAB-SMART-850H-RCK%
TYPE KNAPSACK ORDER (Price+Channel) XADVANCE (Channel) OPTIMIZE
(1,1,1,1)(Slots,Height,SharedSlots,SharedHeight,FibreSlots,FibreHeight) SIZE
(1,6)
FROM
"STORAGE-PL850H " IN (1,1),
"STORAGE-F2-HALF-RACK " (2,2),
"STORAGE-F2-HALF-RACK " (1,1),
"STORAGE-F2-RACK " (1,6),
"STORAGE-F1-RACK " (1,6),
"STORAGE-F1-RSO-RACK " (1,6),
"STORAGE-FIBER-RACK " (1,12);

*FIG. 8*

DCFit.hdf

%DCFIT-850H-RCK%
TYPE STRUCT;
INTEGER TotalOutlets 2;
@Number of external SCSI connectors (VHDC, normal)
STRING SCSIControllers "CTLTAB-SCSI-1-1 ";
@Record name of controller table for regular SCSI technology.
STRING SMARTControllers "CTLTAB-SMART-1-0 ";
@Record name of controller table for SMART technology.
STRING SCSIDriveCages "DCTAB-SCSI-850H-RCK ";
@Record name for drive cage table for regular technology.
STRING SMARTDriveCages "DCTAB-SMART-850-RCK ";
@Record name for drive cage table for SMART technology.
STRING PlugDriveFreebies"" ;
@Vector of pluggable drive freebies in that model. The position is the id of the drive.
@For instance "02 00 03" would mean that 2 free drives of drive type nr. 0, none of type nr. 1, 3 free drives of drive type nr.2
STRING NonPlugDriveFreebies"" ;
@Same for non-pluggable drives.

*FIG. 9*

DriveCages.hdf

%DRVCAGE-F-RSO%
TYPE STRUCT ATTRIBUTE /INVISIBLE ;
STRING ExternalName "Drive Cage Model U1 (RSO)" ATTRIBUTE /ICON:16 /PROMOTED ;
@External name is not internationalized because the cage is not necessarily a part (in the U2, there are two drive cages).
INTEGER HeightThinDrives 16 ATTRIBUTE /INVISIBLE ;
@Virtual height of thin drives.
INTEGER HeightThickDrives 16 ATTRIBUTE /INVISIBLE ;
@Virtual height of thick drives.
INTEGER HeightDriveCage 112 ATTRIBUTE /INVISIBLE ;
@Virtual height of the drive cage.
INTEGER InternalDriveCage 0 ATTRIBUTE /INVISIBLE ;
@Is this an internal (in the server) drive cage (0=no/1=yes).
INTEGER ID 0 ATTRIBUTE /INVISIBLE ;
@Unique ID of the drive cage.
INTEGER Quadratic 0 ATTRIBUTE /INVISIBLE ;
@Special processing flag for drive cage fitting.
INTEGER Channel 1 ATTRIBUTE /INVISIBLE ;
@Number of logical channels.
INTEGER SharedChannel 1 ATTRIBUTE /INVISIBLE ;
@Number of logical channels that are shared between controller pair.
INTEGER FiberChannel 0 ATTRIBUTE /INVISIBLE ;
@Number of logical channels that are used for fiber controllers.
INTEGER PluggableDriveCage 1 ATTRIBUTE /INVISIBLE ;
@Is this drive cage pluggable (0=no/1=yes).
INTEGER TechIndex 7 ATTRIBUTE /INVISIBLE ;
@Tech index, see Controller.hdf
INTEGER Drives 0 ATTRIBUTE /INVISIBLE ;
@This is a field that will be filled with the set of drive arrays.
VALUE Price Drives.Price ATTRIBUTE /VIRTUAL ;

FIG. 11A

%STORAGE-F1-RSO-RACK%
TYPE STRUCT ATTRIBUTE /INVISIBLE ;
INCLUDE Board "RSOBOARD-F1";
@This is a component that is added to upgrade U1 to RSO
BAG DriveCages FROM "DRVCAGE_F_RSO" ATTRIBUTE /INVISIBLE ;
@This is a set of all drive cages (see previous record) that are contained in this
 storage system.
INTEGER RackSpace 4 ATTRIBUTE /INVISIBLE ;
@Rack space.
INTEGER Slots 7 ATTRIBUTE /INVISIBLE ;
@Maximal amount of drive bays that can be filled.

FIG. 11A

INTEGER Height 112 ATTRIBUTE /INVISIBLE ;
@Maximal height of drives (in 1/10th of an inch)
INTEGER SharedSlots 7 ATTRIBUTE /INVISIBLE ;
@Maximal amount of shared drive bays that can be filled.
INTEGER SharedHeight 112 ATTRIBUTE /INVISIBLE ;
@Maximal height of shared drives that can be filled into the storage system.
INTEGER FibreSlots 0 ATTRIBUTE /INVISIBLE ;
@Maximal amount of drives configured with fiber technology that can be filled into
the storage system.
INTEGER FibreHeight 0 ATTRIBUTE /INVISIBLE ;
@Maximal height of drives configured with fiber technology that can be filled into
the storage system.
INTEGER ID 0 ATTRIBUTE /INVISIBLE ;
@Unique ID of the drive cage.
VALUE Price PartPrice+Board.Price ATTRIBUTE /VIRTUAL ;
VALUE PartPrice Price.PN304100B21 GLOBAL ATTRIBUTE /VIRTUAL ;
VALUE Channel DriveCages.Channel ATTRIBUTE /INVISIBLE ;
@Total amount of channels needed for the storage system.
INTEGER TechIndex 7 ATTRIBUTE /INVISIBLE ;
@Tech index (see controller.hdf)
VALUE PartNo PartNo.PN304100B21 GLOBAL ATTRIBUTE/INVISIBLE;
VALUE ExternalName ExternalName.PN304100B21 GLOBAL ATTRIBUTE
/ICON:16 /PROMOTED ;

FIG. 11B

*Drives.hdf*

%WIDE-ULTRA-SCSI-10-2100-FREE%
@This is a free drive
TYPE STRUCT ATTRIBUTE /INVISIBLE ;
STRING ExternalName "2.1-GB Wide-Ultra SCSI (1")" ATTRIBUTE /ICON:13 ;
INTEGER Price 0 ATTRIBUTE /INVISIBLE ;

%WIDE-ULTRA-SCSI-10-2100-PLUG%
@This is a regular drive
TYPE STRUCT ATTRIBUTE /INVISIBLE ;
VALUE Price Price.PN242583001 GLOBAL ATTRIBUTE /VIRTUAL ;
VALUE PartPrice Price.PN242583001 GLOBAL ATTRIBUTE /VIRTUAL ;
VALUE PartNo PartNo.PN242583001 GLOBAL ATTRIBUTE /INVISIBLE ;
VALUE ExternalName ExternalName.PN242583001 GLOBAL ATTRIBUTE
/ICON:13 ;

DRIVE-0%
@This is a logical grouping of drives that share the same capacity.
TYPE STRUCT ;
STRING ExternalName "2.1-GB Wide-Ultra SCSI (1")" ;
@External Name: Remember that this is not a device record, so no part number
to key ooff
INTEGER ID 0 ;
@Internal unique ID (is important for freebie vectors in DCFit.hdf)
INTEGER Capacity 2097 ATTRIBUTE /INVISIBLE ;
@Capacity in MB
INTEGER Height 1000 ATTRIBUTE /INVISIBLE ;
@Height in 1/1000th of an inch.
INTEGER RPM 7200 ATTRIBUTE /INVISIBLE ;
@Revolutions per minute
INTEGER Pluggability 6 ;
@#define DRIVE_PLUGGABLE 0x4
@#define DRIVE_NONPLUGGABLE 0x2
@#define DRIVE_FREE 0x1
@#define DRIVE_NORMAL 0x0
INTEGER Ranking 3 ;
@A static ranking that enables some recommendation to the user.
BAG Drives FROM "WIDE-ULTRA-SCSI-10-2100-PLUG", "WIDE-ULTRA-SCSI-10-2100-FREE", "WIDE-ULTRA-SCSI-10-21000NONPLUG", "WIDE-ULTRA-SCSI-10-2100-FREE";
@These are the devices that we lump together under this drive group.

*FIG. 12*

*Hubs.hdf*

```
%HUB-7%
TYPE STRUCT ATTRIBUTE /INVISIBLE ;
VALUE PartPrice Price.PN234453001 GLOBAL ATTRIBUTE /VIRTUAL;
VALUE Price PartPrice ATTRIBUTE /VIRTUAL ;
VALUE PartNo PartNo.PN234453001 GLOBAL ATTRIBUTE /INVISIBLE ;
VALUE  ExternalName  ExternalName.PN234453001   GLOBAL  ATTRIBUTE
/ICON:20 /PROMOTED;
```

FIG. 13

*MemFit.hdf*

```
%MEMTAB-1-4-32%
TYPE KNAPSACK ORDER (Price) OPTIMIZE (1)(Capacity) SIZE (1,4) FROM
@Create a table that is y-ordered according to module price, x-ordered according
to cardinality of set, and uses Capacity as a secondary search criterion. The table
has 4 columns (x_max = 4).
"MEM-1-32-FREE" IN (1,1),
@Free memory module with 32 MB can reside in slot #1
"MEM-1-16" IN (1,4),
@ All slots
"MEM-1- 32" IN (1,4),
@ All slots
"MEM-1- 64" IN (1,4),
@ All slots
"MEM-1-128" IN (1,4),
@ All slots
```

FIG. 14

*MemModules.hdf*

%MEM-1-16%
TYPE STRUCT ATTRIBUTE/INVISIBLE:
INTEGER Capacity 16 ATTRIBUTE/INVISIBLE;
VALUE Price Price.PN225481001 GLOBAL ATTRIBUTE/VIRTUAL;
VALUE PartPrice Price.PN225481001 GLOBAL ATTRIBUTE/VIRTUAL;
VALUE PartNo PartNo.PN225481001 GLOBAL ATTRIBUTE/INVISIBLE:
VALUE ExternalName ExternalName.PN225481001 GLOBAL ATTRIBUTE
/ICON:10;

%MEM-1-32-FREE%
TYPE STRUCT ATTRIBUTE/INVISIBLE;
STRING ExternalName "32-MB Memory Module (1 x 32 MB, 60ns,Unbuffered EDO DIMM)" ATTRIBUTE/ICON:10;
INTEGER Price 0 ATTRIBUTE/VIRTUAL;

FIG. 15

*NicFit.hdf*

%NICFIT-1%
TYPE STRUCT ;
STRING DefaultNic "NIC-0" ;
@The default NIC type the server should be sized with if no type is requested.
STRING NicFreebies "01 00" ;
@The amount of free nics that come with the system. The format is "nn nn nn nn" and the component of the vector is the NIC's ID.
STRING NicFreebiesOnBoard "01 00" ;
@The amount of NICS that live on the motherboard (no PCI slots needed). Similar to previous entry.

FIG. 16

*Nics.hdf*

%NET-10-100-TX-PCI-UTP-FREE%
TYPE STRUCT ATTRIBUTE /INVISIBLE ;
STRING ExternalName "Netelligent 10/100 TX PCI UTP Controller " ATTRIBUTE /ICON:8 ;
INTEGER Price 0 ATTRIBUTE /INVISIBLE ;

%NET-10-100-TX-PCI-UTP%
TYPE STRUCT ATTRIBUTE /INVISIBLE ;
VALUE Price Price.PN169845001 GLOBAL ATTRIBUTE /VIRTUAL ;
VALUE PartPrice Price.PN169845001 GLOBAL ATTRIBUTE /VIRTUAL ;
VALUE PartNo PartNo.PN169845001 GLOBAL ATTRIBUTE /INVISIBLE ;
VALUE ExternalName ExternalName.PN169845001 GLOBAL ATTRIBUTE /ICON:8
;

%NIC-0%
TYPE STRUCT ;
STRING ExternalName "Netelligent 10/100 TX PCI UTP Controller " ;
@Explicit external Name because there is no part number.
INTEGER ID 0
@Unique ID.
STRING Description "The Netelligent 10/100 TX PCI UTP controller offers high performance networking for 10 or 100Base-T networks. It's plug and play capability provides conflict-free auto configuration and easy installation. The Netelligent 10/100 TX PCI UTP controller is also designed to lower CPU utilization levels while significantly increasing data throughput." ;
@Marketing description.
INTEGER NicTechnology 1 ;
@#define NIC_ETHER        0x1
@#define NIC_TOKEN        0x2
@#define NIC_FDDI         0x4
INTEGER Connector 1 ;
@#define NIC_UTP          0x1
@#define NIC_TTP          0x2
@#define NIC_STP          0x4
@#define NIC_FIB_SC       0x8
@#define NIC_FIB_MIC 0x10
INTEGER Bandwidth0 10 ;
@Minimum Bandwidth in Mb/s
INTEGER Bandwidth1 100 ;
@Maximum Bandwidth in Mb/s
INTEGER Qty 1 ;

*FIG. 17A*

@Number of actual connectors
BAG Nics FROM "NET-10-100-TX-PCI-UTP", "NET-10-100-TX-PCI-UTP-FREE";
@This is a set of NICS that are lumped together in this record.

FIG. 17B

PartNo.hdf

%PARTNO%
TYPE STRUCT ;
STRING PN234453001 "234453-001" ATTRIBUTE /INVISIBLE;
STRING PN283697001 "283697-001" ATTRIBUTE /INVISIBLE;
STRING PN273315B21 "273315-B21" ATTRIBUTE /INVISIBLE;
STRING PN289726B21 "289726-B21" ATTRIBUTE /INVISIBLE;
STRING PN296372B21 "296372-B21" ATTRIBUTE /INVISIBLE;

FIG. 18

*PLXXXX.hdf*

%PL1200-SLOTS%
TYPE STRUCT ;
INTEGER PCIHotPlugSlots 0;
@PCI Hot Plug slots
INTEGER PCISlots 2;
@PCISlots (no frills)
INTEGER SharedSlots 4;
@Shared PCI/EISA Slots
INTEGER EISASlots 0;
@EISA slots %PL1200-AVAILABILITY%
TYPE STRUCT;
INTEGER Ranking 3;
@Static ranking to make recommendations possible
INTEGER ProcUpgrade 0;
@Upgradeable to Deshutes.
INTEGER TowerElseRack 1;
@Tower=1,Rack=2
INTEGER SMP 0;
@SMP capable (0=no,1=yes)
INTEGER                    RedundantVRM         0;
@Redundant VRM (0=no,1=yes).
INTEGER PCIHotPlug 0;
@Upgradeable to Deshutes.
INTEGER ProcUpgrade 0;
@PCI Hot plug slots (0=no,1=yes)
INTEGER Powersupply 2;
@Power supply (0=std,1=redundant,2=hot pluggable).
INTEGER SCSIElseRAID 3;
@Goes with which controller technology (0x1=SMART,0x2=Regular SCSI, 3=both)

%PL1200-7-233-M1-DISPLAY%
TYPE STRUCT ATTRIBUTE/ICON:1 COMMENT/STRINGID:1;
INTEGER ProcDisplay 0 ATTRIBUTE/INVISIBLE;
@This is where the processor subsystem will be substituted.INETEGER 0 is a Placeholder.

*FIG. 19A*

```
INTEGER SlotDisplay 0 ATTRIBUTE/INVISIBLE;
@This is where the PCI slot subsystem (NIC + Storage) will be substituted.
INTEGER 0 is a placeholder.
VALUE PartPrice Price.PN292910001 GLOBAL ATTRIBUTE/VIRTUAL;
@The system price.
VALUE Price PartPrice+ProcDisplay.Price+MemDisplay.Price+SlotDisplay.Price
ATTRIBUTE/VIRTUAL;
@The total price of the ready configured machine.
VALUE PartNo PartNo.PN292910001 GLOBAL ATTRIBUTE/INVISIBLE;
@The system part number.
VALUE ExternalName ExternalName.PN292910001 GLOBAL COMMENT
/STRINGID:2;
@The system name.

%PL1200-7-233-M1%
TYPE STRUCT;
STRING ExternalName "Proliant 1200 6/233 Model 1 (512-KB cache)";
@The name of the server.
STRING ProcFit "PROCFIT-3-7-233-512" ATTRIBUTE/INVISIBLE;
@Which processor configuration engine.
STRING MemFit "MEMFIT-6-64-512" ATTRIBUTE/INVISIBLE;
@Which memory configuration engine.
STRING SlotFit "SLOTFIT-1200-TWR" ATTRIBUTE/INVISIBLE;
@Which slot configuration engine
STRING Features "PL1200-AVAILABILITY";
@What features are available.
STRING Model "PL1200-7-233-M1-DISPLAY";
@Which record is used for display.

%PL1200%
TYPE STRUCT;
STRING Name "Proliant 1200';
@External Name.
String Description "The Compaq Proliant 1200 is an affordable and dependable
server for demanding workgroup and remote-office applications. Hot plug drives
give workgroups and remote sites the uptime they need while providing plenty
of disk space for your ever-growing file demands. The Compaq Proliant 1200
is ideally suited for price sensitive users who need a powerful and high
availability server platform that is easy to use.";
@Marketing Description
INTEGER MaximumProcessors 1;
@Maximum processors that machine can have.
INTEGER MaximumMemory 512;
@Maximum supported memory.
```

*FIG. 19B*

STRING ExpansionSlots "PL1200-SLOTS";
@Slot Structure.
BAG Models FROM "PL1200-7-233-M1","PL1200R-7-233-M1";
@Set of models that are contained in this server family.

FIG. 19C global.hdf

LOAD "PRICELIST ";
LOAD "PARTNO ";
LOAD "DESCRIPTION ";

%global%
TYPE STRUCT ;
INCLUDE Price "PRICELIST ";
INCLUDE PartNo "PARTNO ";
INCLUDE ExternalName "DESCRIPTION ";

FIG. 26

*PriceList.hdf*

```
%PRICELIST%
TYPE STRUCT ;
INTEGER PN234453001  975   ATTRIBUTE /INVISIBLE;
INTEGER PN283697001  600   ATTRIBUTE /INVISIBLE;
INTEGER PN273315B21  1500  ATTRIBUTE /INVISIBLE;
INTEGER PN289726B21  4600  ATTRIBUTE /INVISIBLE;
INTEGER PN296372B21  4600  ATTRIBUTE /INVISIBLE;
```

*FIG. 20*

*PowerSupply.hdf*

```
%PL1200-1600-2500-RED-POWER%
TYPE STRUCT ATTRIBUTE /INVISIBLE ;
VALUE Price Price.PN283697001 GLOBAL ATTRIBUTE /VIRTUAL ;
VALUE PartPrice Price.PN283697001 GLOBAL ATTRIBUTE /VIRTUAL ;
VALUE PartNo PartNo.PN283697001 GLOBAL ;
VALUE ExternalName ExternalName.PN283697001 GLOBAL ;
```

*FIG. 21*

*ProcFit.hdf*

```
%PROCTAB-2-6-200-256%
TYPE SET SIZE (1,2) FROM
@Simple set of size 1 or 2
"PROC-6-200-256" IN (1,1),
@The free processor can only live in slot #1 (only one is free)
"PKIT-2-6-200-256" IN (2,2) ATTRIBUTE /INVISIBLE
@The other slot can be manned with an upgrade kit.

%PROCFIT-2-6-200-256%
TYPE STRUCT ATTRIBUTE /INVISIBLE ;
INTEGER MaxProcQuanity 2 ATTRIBUTE /INVISIBLE ;
@The maximum processor quanity.
INTEGER Generation 6 ATTRIBUTE /INVISIBLE ;
@6=Pentium Pro, 7=Pentium II, 8=Pentium II Xeon
INTEGER MHz 200 ATTRIBUTE /INVISIBLE ;
INTEGER Cache 256 ATTRIBUTE /INVISIBLE ;
@Cache in KB
INCLUDE Processors "PROCTAB-2-6-200-256";
@The processor table
```

*FIG. 22*

Processors.hdf

%PROC-6-200-256%
TYPE STRUCT ATTRIBUTE /INVISIBLE ;
STRING ExternalName "Pentium Pro 200 MHz (256KB cache)" ATTRIBUTE
/ICON:6 /PROMOTED ;
INTEGER Price 0 ATTRIBUTE /INVISIBLE ;
INTEGER Quantity 1 ATTRIBUTE /INVISIBLE ;

%PKIT-9-6-200-512%
TYPE STRUCT ATTRIBUTE /INVISIBLE ;
INTEGER Quantity 1 ATTRIBUTE /INVISIBLE ;
VALUE Price Price.PN169470B21 GLOBAL ATTRIBUTE /VIRTUAL ;
VALUE PartPrice Price.PN169470B21 GLOBAL ATTRIBUTE /VIRTUAL ;
VALUE PartNo PartNo.PN169470B21 GLOBAL ATTRIBUTE /INVISIBLE COMMENT
/STRINGID:3 ;
VALUE ExternalName ExternalName.PN169470B21 GLOBAL ATTRIBUTE /ICON:6
/PROMOTED ;

FIG. 23

SlotFit.hdf

%SLOTFIT-850H-RCK%
TYPE STRUCT ;
STRING DCFit "DCFIT-850H-RCK" ;
@Drive cage/ controller configuration record.
STRING NicFit "NICFIT-1 ";
@NIC configuration record.
INTEGER Slots 3 ;
@Number of PCI slots.
INTEGER HotPlugSlots 0 ;
@Number of hot plug slots.

FIG. 24 cpqHdw.hdf

@==========================================================
@ Copyright (C) 1997,1998 - Compaq Computer Corporation
@==========================================================
@{WEBLINK:http://inline.compaq.com/sizer}
@The web link can serve as a URL to get more information
@{EXPIRES:07-31-1998}
@When the hardware set ceases to be up to date (format: MM-DD-YYYY)
@Model Names %CPQ-SERVFAM%
TYPE STRUCT
STRING Proliant850R "PL850R"
STRING Proliant1200 "PL1200"
STRING Proliant1600 "PL1600"
STRING Proliant2500 "PL2500"
STRING Proliant3000 "PL3000"
STRING Proliant5500 "PL5500"
STRING Proliant6000 "PL6000"
STRING Proliant6500 "PL6500"
STRING Proliant7000 "PL7000"

%CPQ-DRIVES%
TYPE STRUCT;
STRING Drive0 "DRIVE-0";
STRING Drive1 "DRIVE-1";
STRING Drive2 "DRIVE-2";
STRING Drive3 "DRIVE-3";
STRING Drive4 "DRIVE-4";
STRING Drive5 "DRIVE-5";
STRING Drive6 "DRIVE-6";

@Set of NICS supported.
%CPQ-NICS%
TYPE STRUCT;
STRING Nic0 "NIC-0";
STRING Nic1 "NIC-1";
STRING Nic2 "NIC-2";
STRING Nic3 "NIC-3";
STRING Nic4 "NIC-4";
STRING Nic5 "NIC-5";
STRING Nic6 "NIC-6";
STRING Nic7 "NIC-7";

*FIG. 25A*

@This is the master record that binds previous three records together.
%CPQHDW%
TYPE STRUCT;
INCLUDE ServerFamilies "CPQ-SERVFAM";
INCLUDE Drives "CPQ-DRIVES";
INCLUDE Nics "CPQ-NICS";

@Hardware shared by systems
@All previously described files are loaded.
LOAD "HUBS";
LOAD "POWERSUPPLY";
LOAD "PROCESSORS";
LOAD "BOARDS";
LOAD "CONTROLLERS";
LOAD "MEMMODULES";
LOAD "DRIVES";
LOAD "DRIVECAGES";
LOAD "CONVERSIONS";
LOAD "NICS";
LOAD "MEMFIT";
LOAD "NICFIT";
LOAD "DCCTLTAB";
LOAD "DCFIT";
LOAD "SLOTFIT";
LOAD "PROCFIT";

@Al systems have to be loaded.
LOAD "PL850R";
LOAD "PL1200";
LOAD "PL1600";
LOAD "PL2500";
LOAD "PL3000";
LOAD "PL5500";
LOAD "PL6000";
LOAD "PL6500";
LOAD "PL7000";

*FIG. 25B*

SYSTEM FOR DESCRIBING AND STORING DESCRIPTIONS OF HIERARCHICAL STRUCTURES USING HARDWARE DEFINITION FILES TO SPECIFY PERFORMANCE, CHARACTERISTICS, PART NUMBER AND NAME OF HARDWARE COMPONENTS

CROSS-REFERENCE TO RELATED APPLICATIONS

This application is related to the following copending, concurrently filed, and commonly assigned United States patent applications which are hereby incorporated by reference:

U.S. patent application Ser. No. 09/126,022, now U.S. Pat. No. 6,263,382, entitled "SIZER FOR INTERACTIVE COMPUTER SYSTEM CONFIGURATION" to Christoph Schmitz, Keith L. Kelley, Charles A. Bartlett, and Manoj J. Varghese;

U.S. patent application Ser. No. 09/126,025, now U.S. Pat. No. 6,253,312, entitled "METHOD OF DEVELOPING PHYSICAL REQUIREMENTS FOR COMPUTER CONFIGURATION" to Christoph Schmitz, Keith L. Kelley, Charles A. Bartlett, and Manoj J. Varghese; and U.S. patent application Ser. No. 09/126,024, now U.S. Pat. No. 6,192,670, entitled "PRICE/PERFORMANCE BASED COMPUTER CONFIGURATION" to Christoph Schmitz, Keith L. Kelley, Charles A. Bartlett and Manoj J. Varghese.

BACKGROUND OF THE INVENTION

1. Field of the Invention

The present invention relates generally to a system that uses hardware description files (HDF) to generate component selection information. The method enables a application specific computer system configuration device (a "sizer") and a framework that provides common services to all sizers (a "framework") to store, retrieve, and process computer hardware information so that a user can interactively configure a computer system.

2. Description of the Related Art

The original computers were very complex devices that required skilled technicians and scientists to operate. When a new device, such as a printer, was added to the computer, special software and hardware needed to be developed specifically for the new device. With the advent of personal computers, it became impractical to require users to develop new software and hardware whenever new hardware was added.

Computer components eventually became standardized and one of the important pieces of the puzzle was the Disk Operating System, or DOS. Originally DOS only supported a small number of devices such as printers, floppy drives, and hard disk drives. In addition, DOS was severely limited in the number of different computer configurations and components such as memory and peripherals that could be supported.

Today, the typical consumer is presented with an astonishing number of choices with respect to the configuration of a new computer. A computer can be tailored to the particular needs of every user, from a multi-national corporation with immense database requirements to an individual who only desires to log into the Internet. There are computers specialized to perform such tasks as bulk memory storage, communications, and game playing. Depending upon a user's needs, a computer can be configured with anywhere from 16 Megabytes (Megs) to hundreds of Megs of Random Access Memory (RAM). Static storage such as hard disk drives can vary in capacity from gigabytes ($10^9$ bytes) to Terabytes ($10^{12}$ bytes) of data, each arranged in any one of a large number of configurations. Obviously, large amounts of RAM and static storage cost proportionally more money. As a result, there is usually a tradeoff between price and performance.

The number of possible devices that can be added to any particular system has also grown. Computers now routinely come with devices that were unavailable even a few decades ago, such as speakers, CD-ROM drives, and fax modems. In addition, a user can add a large number of additional components such as tape drives, network cards, and specialized, game playing devices such as a joy stick. The number of possible choices for a computer system configuration is multiplied by the number of manufacturers that produce each component producing perhaps millions of possible systems.

SUMMARY OF THE INVENTION

Using a method implemented according to the invention, computer hardware is specified using a hardware description language (HDL) and the specifications are stored in Hardware Definition Files (HDF). Using HDL and HDFs, a device such as a interactive computer system configuration device, or sizer, is able to allow a user to interactively specify requirements for a computer and peripheral hardware. Although HDL is effective at describing computer hardware, HDL is designed to describe hierarchical structures in general and is not limited to computer hardware.

HDL does not have control flow nor assignment statements, that is, it is purely designed to define data. In one embodiment, data is an ordered collection of trees whose leaves consist of strings and integers. Moreover, the branches of the trees are labeled with identifiers. HDL has no direct tie to computer hardware, but, since computer hardware is built hierarchically (a system consists of memory/CPU/storage subsystems, a memory subsystem consists of modules, which in turn have attributes, all of which can be addressed by a keyword), a tree can be effectively used to describe computer hardware. Rarely does one want to describe only one instance of a tree. Typically, one is interested in a whole sequence of trees that share some more or less complex property. The complex property is expressed in its own tree rather than enumerate it in every tree individually. This feature is built into HDL and makes the hardware description file very concise. The general approach facilitates extending or modifying a hardware description. For example, a peripheral devices such as a tape backups or printer can be added to a model without compromising the format of the model as it already exists.

In one embodiment, HDL enables a user to create extendable and modifiable hardware descriptions that can be utilized by a sizer framework to generate a computer system configured to a customer's specifications. Every piece of hardware can be represented in HDL as a tree. A computer box has room for, among other things, a mother board, a network interface card (NIC), and disk drives. The computer box, the mother board, the network card, and the disk drives can all be represented in HDL as hardware trees. In the case of the computer box, the tree would contain a leaf, or terminal, which could be replaced by a tree representing a disk drive. In this way, a disk drive can be added to the representation of the computer box without compromising any other device that might already be present, like an existing network card. If there are no available terminals in the HDL description of the computer box, HDL makes apparent that another disk drive could not be added to the configuration. In addition, a terminal that represents a half size slot would not be able to accommodate a tree representing a full size device. In one embodiment, a decision on the disk drive's inclusion may be facilitated by a method that converts requirements between physical and logical representations. In this way, HDL prevents a user of a sizer utilizing HDL from creating an unusable configuration.

BRIEF DESCRIPTION OF THE DRAWINGS

A better understanding of the present invention can be obtained when the following detailed description of the preferred embodiment is considered in conjunction with the following drawings, in which:

FIG. 4 is a portion of a hardware description file; and

FIGS. 5–26 are hardware description files implemented according to the invention.

DETAILED DESCRIPTION OF INVENTION

Figure 1:
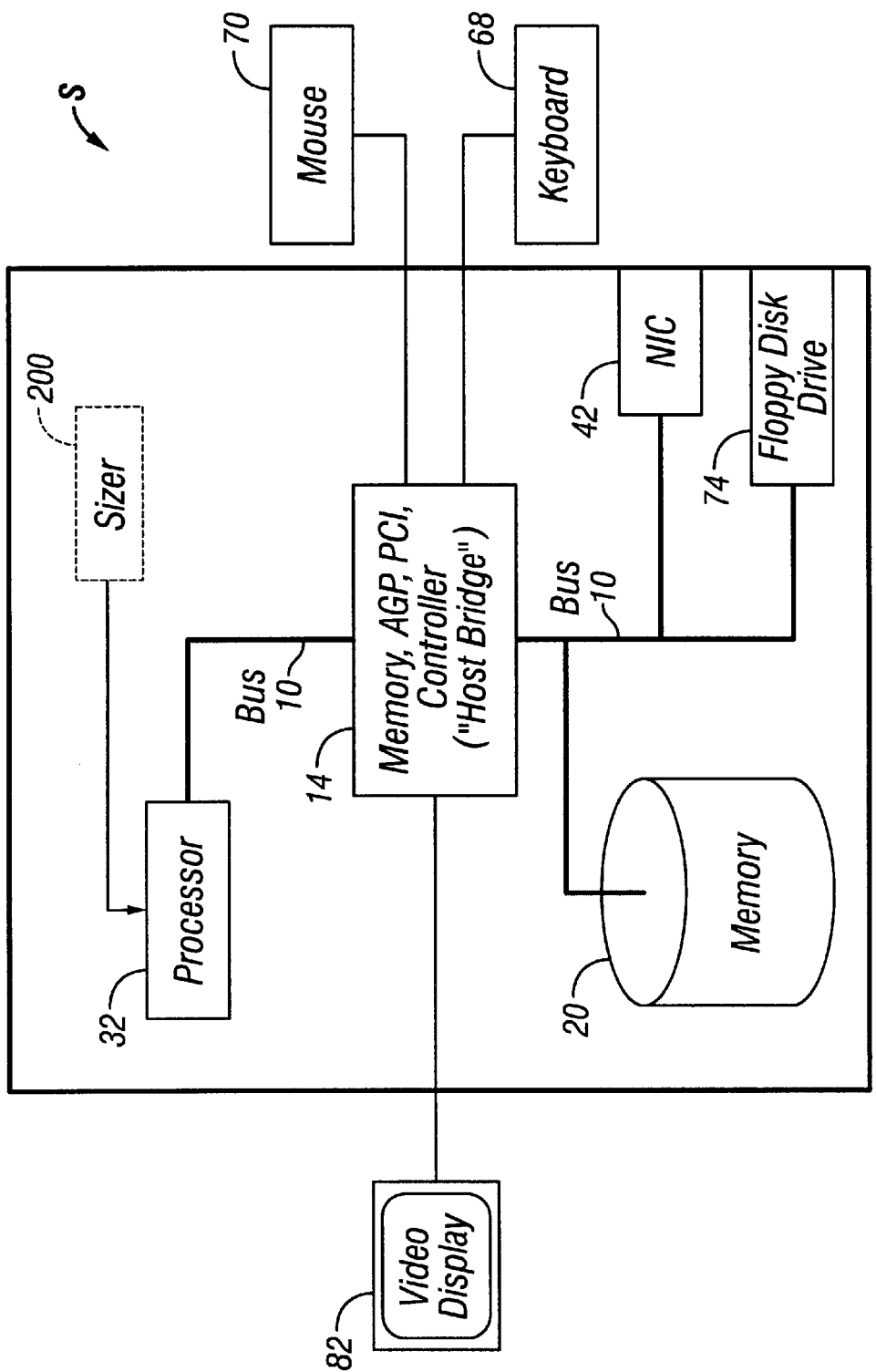
FIG. 1 is a block diagram of a computer system capable of being programmed in accordance with the present invention.

Turning to FIG. 1, illustrated is a typical computer system S in which the sizing techniques according to the invention can be run. The computer system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 32 and a memory subsystem 20.

The host bridge 14 in the disclosed embodiment is a 440LX Integrated Circuit by Intel Corporation, also known as the PCI AGP Controller (PAC). The processor 32 is preferably a Pentium II. The processor 32 could be replaced with a different processor other than the Pentium II without detracting from the spirit of the invention.

The PCI bus 10 couples a variety of devices that generally take advantage of a high speed data path. This includes a network interface controller (NIC) 42, which preferably supports the ThunderLan™ power management specification by Texas Instruments, and a floppy disk drive 74. The floppy disk drive 74 preferably would be a 3½" floppy disk. A video display 82, a mouse 70, and a keyboard 68 can also be coupled to the host bridge 14, enabling interaction with the computer system S.

Finally, a sizer application 200 (see FIG. 3) would run on the processor 32 and utilize the other devices of computer system S (see previously incorporated U.S. patent application entitled "Sizer For Interactive Computer System Configuration").

The computer system S illustrates only one platform in which the system according to the present invention can be implemented. The disclosed techniques can, without distracting from the spirit of the invention, be implemented in any device that executes computer programs, regardless of whether the device contains less, additional, or different components than the system in FIG. 1.

THE TARGET SYSTEM CONFIGURATION

The techniques of the current invention can be utilized any time it is necessary to describe a hierarchical structure such as a computer system. In one embodiment of the present invention, the methods can be used within a sizer to create a system configuration.

Figure 2:
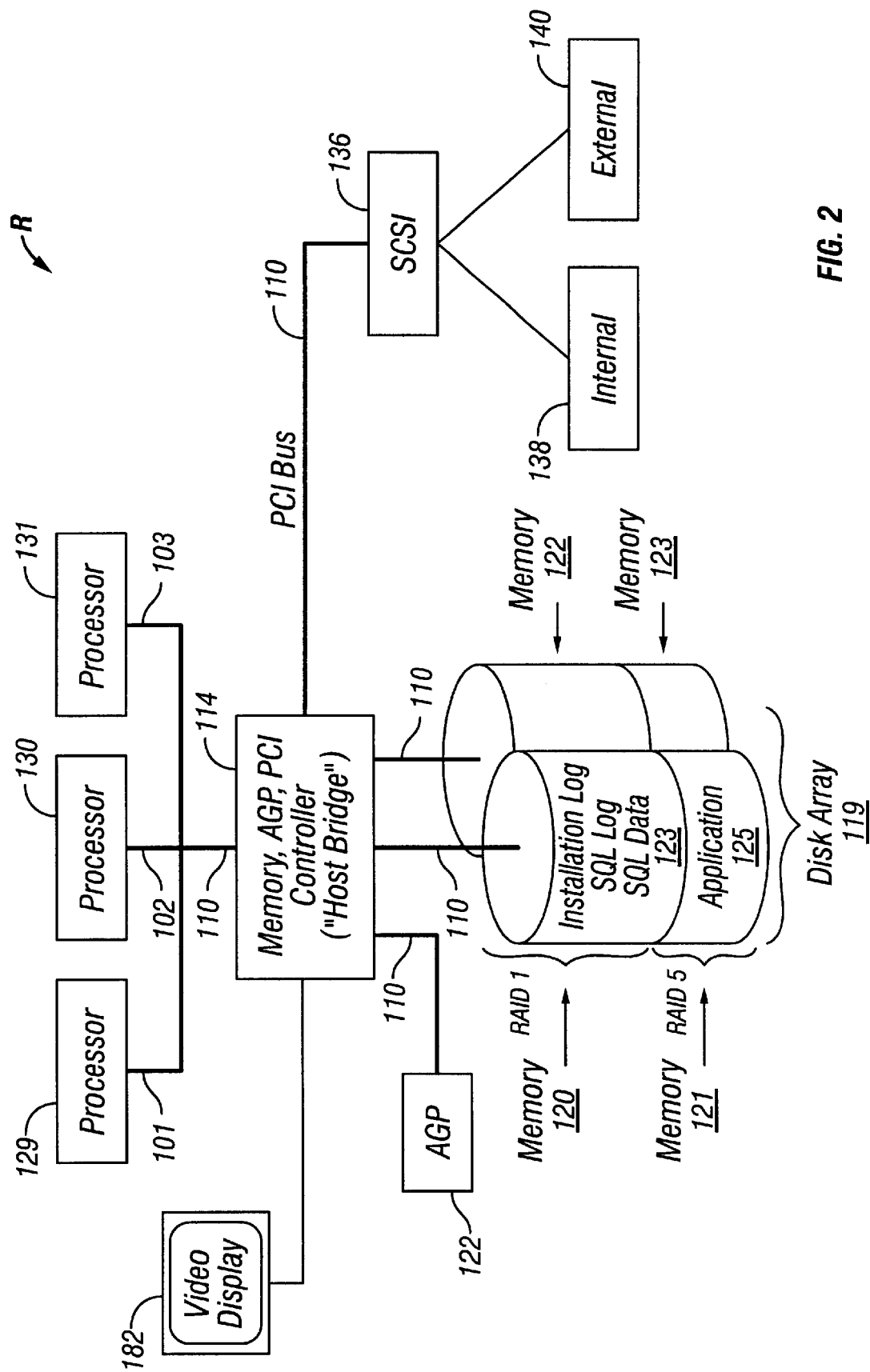
FIG. 2 is a block diagram of a computer system capable of being configured by an interactive computer system configuration device using the present invention.

Turning to FIG. 2, illustrated is a computer system R capable of being configured by a sizer using HDL. The computer system R contains multiple processors 129, 130, and 131. The processors 129, 130, and 131 are each connected to their own host buses 101, 102, and 103 respectively, which in turn connect to a PCI bus 110. The PCI bus 110 is controlled by PCI controller circuitry located within a memory/accelerated graphics port (AGP)/PCI controller 114. This controller 114 (the "host bridge") couples also the PCI bus 110 to four memory subsystems 120–123. The PCI bus 110 couples a variety of devices that generally take advantage of a high speed data path. This includes a small computer system interface (SCSI) controller 136, with both an internal port 138 and an external port 140. In addition, a video display 182 can be coupled PCI controller 114 for display of data by the computer system R.

There is a relatively loose connection between the computer system R and the memory subsystems 120–123. The major constraint includes the number of controllers 114 which can be installed in the computer system R. In one embodiment, this information is maintained by a sizer framework 206 from information retrieved from hardware description files 208–214 (see FIG. 3). The information in the HDFs may contain additional data such as a user-defined PCI slot reservation for non-performance related expansions such as NICs or a Remote Insight Board.

Figure 3:
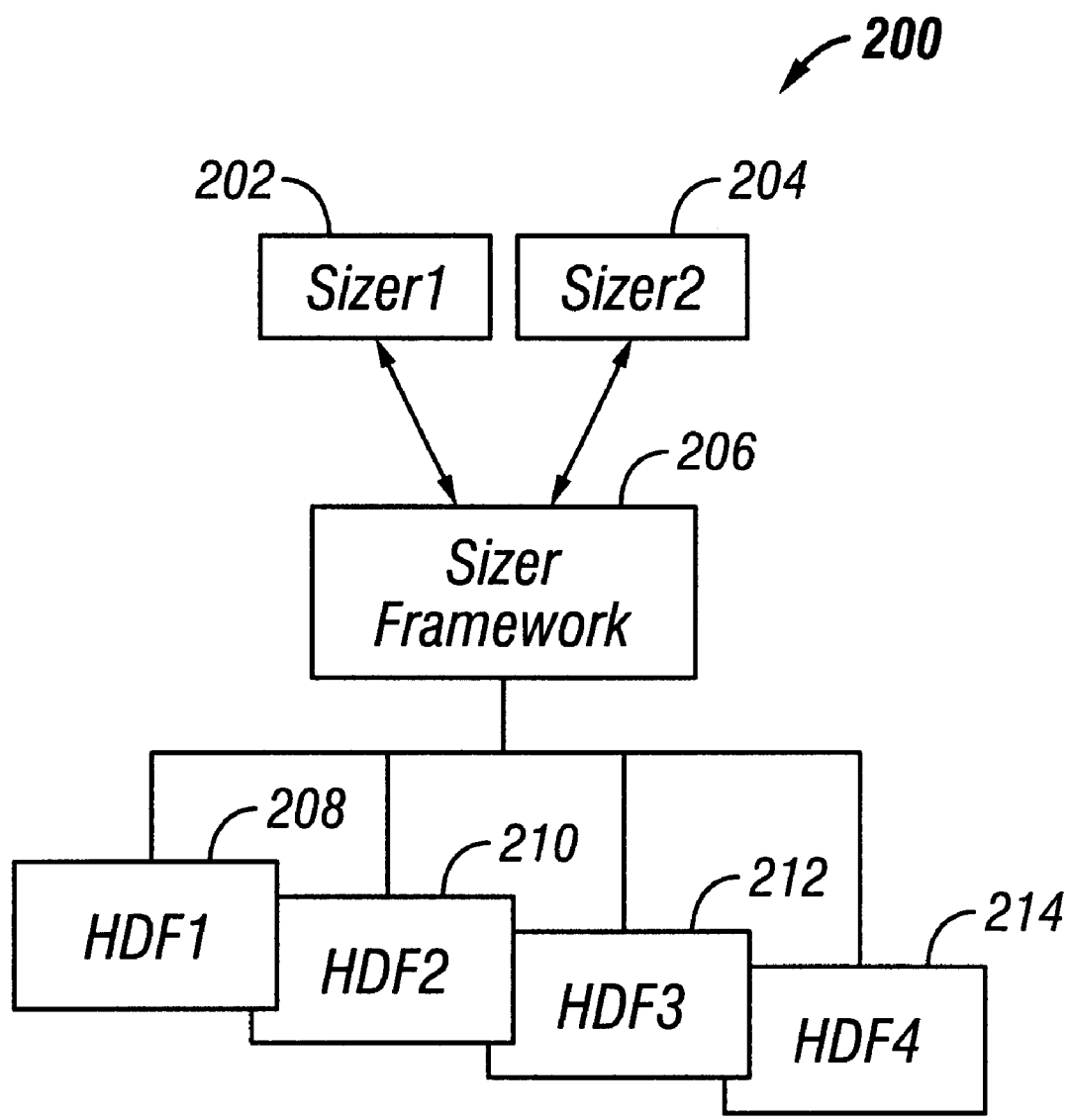
FIG. 3 is a block diagram of a computer system configuration program, or sizer, including application specific sizer modules, a sizer framework, and hardware definition files.

Turning now to FIG. 3, illustrated is a sizer capable of utilizing HDL and HDFs to generate a system configuration, including a price/performance calculation (see previously incorporated U.S. patent application entitled "Price/Performance Based Computer Configuration"). A sizer, complete with application sizer modules 202 and 204, a sizer framework 206, and hardware description files (HDFs) 208–214 is shown. In this embodiment of the present invention, the application sizer modules 202 and 204 are designed individually for a specific application such as a computer designated as a Microsoft SQL server, a Microsoft NT server, or an Oracle database server. The sizer framework 206 contains all functionality common to any current or future application sizers. The methods of the present invention, when utilized by a sizer, enable a software developer to create and modify application sizers simply by creating or modifying an HDF.

The HDFs 208–214 are read in by the sizer framework 206 and contain descriptions of all hardware available to be configured into the computer system R. Examples of hardware, besides entire computer systems, that may be described in HDFs are memory chips, hard disks, network interface cards (NICs), memory controllers, and CD-ROM drives. A application sizer 202 or 204 may not need all the descriptions read into memory from the HDFs but the sizer framework 206, not knowing what a specific application sizer 202 or 204 needs, reads in all that are available. In this embodiment of the present invention, the application sizers 202 and 204 have no direct connection with the HDFs 208–214, but instead rely on the sizer framework 206 for information on available hardware. In another embodiment, the application sizers 202 & 204 may utilize HDL and HDF directly, either solely or in conjunction with the framework 206.

Turning now to FIG. 4, illustrated is a portion of a hardware description file (HDF) describing the structure of a family of servers from the ProLiant family manufactured by the Compaq Computer Company, Houston, Tex. The line numbers are not part of the HDF but are added for the reader's convenience.

FIG. 4 illustrates several of the language constructs of HDL. For instance, the "%" characters at lines 1, 8, 22, 28, and 34 indicate the start of a device record. and the string between the "%" characters indicate the record's tag. The lines beginning with the word "TYPE" at 2, 9, 23, 29, and 35 specify the type of record the next few lines contain. Lines 17–20 which start with the word "INCLUDE" indicate that this device may require additional records in order to be included into a configured system.

Starting at line 1, the term "PL1600-SLOTS" between the "%" characters indicate that a device referred to in lines 1–6 is ProLiant 1600 server and that the subject of the record is the slots available in the device. Line 2 indicates that the record is of type STRUCT. Lines 3–6 list the slot constraints of the device, 0 PCI hot plug slots, 2 PCI slots, 4 shared slots, and 0 Extended Industry Standard Architecture (EISA) slots.

Another record starts at line 8 and ends at line 20. Line 8 indicates that this record contains information about the ProLiant 1600R server family. Line 6 stores the human readable name of the device, the "ProLiant 1600." Lines 11–16 contain a description of the device. Line 17 indicates that the device can have a maximum of 2 processors. Lines 19 and 20 would be understood by HDL to indicate that other records needed to be included when a ProLiant 1600 server is configured. In the tree-like structure of HDL, these lines generate terminals that would accept another record. The terminal at line 19 would correspond to a "PL_1600-SLOTS" record like that found in lines 1–6.

Having described the system S that runs HDL, the system R that is configured by means of a sizer using HDL, the sizer 200 that uses HDL, and an example of a HDL file used by the sizer 200 a more formal description can be made using Backus-Naur notation, a well known metalanguage for describing programming languages. The purpose of a formal description is that it is independent of any hardware description and can apply generally to any appropriate embodiment.

First, the goal is to describe a context free grammar (CFG) G=(N,T,P,S) that generates all syntactically legal HDL programs. The set of terminal and non-terminal symbols T and N will not be enumerated explicitly. Rather a terminal symbol will be displayed as a TERMINAL, whereas a non-terminal symbol will be rendered as a Non-terminal. In one embodiment according to the present invention, the start symbol S is identical to File.

A start can be made by giving production rules for basic types, such as digits, alphanumeric characters, characters, numbers, identifiers, and strings. Note that in this embodiment of the present invention there is no provision for scientific notation, so a number in the HDL context is an integer. Another embodiment might include provisions for scientific notation, as well as such concepts as imaginary numbers.

Digit→0| . . . |9
Alpha→a| . . . |z|A| . . . |Z
Char→Alpha|+|–|_

Number→–Digit|Digit|Number Digit|
Id→Alpha|Id Char
String→ε|String Char

The operations of addition, subtraction, and multiplication are provided for integers, the selection operation "." is available for structured objects as well. Parenthesis allow grouping and prioritizing of expressions. In another embodiment, addition operations such as division and matrix multiplication might be defined.

Exp→Exp+Factor|Exp–Factor
Factor→Factor*Term
Term→Id|Term.Id|(Exp)|Number

A declaration of the basic types can be adorned with attributes (pertaining to a graphical representation of a basic type) and a comment (pertaining to a textual representation of a basic type). Values can be further adorned by the keyword GLOBAL. Another embodiment's might define other attributes.

Atts→/ICON:Number|/INVISIBLE|/NOICON
Atts→/COLLAPSED|/PROMOTED?VIRTUAL|/ENCRYPT
AttList→AttList Atts|Atts
AttList→ATTRIBUTE S AttList|ε
Comms→/NOTEXT|/STRINGID:Number|/TABLEID:Number
CommList→CommList Comms|Comms
Comm→COMMENT CommList|ε
global→ε|GLOBAL Declarations are comprised of a few syntax constructs. In this embodiment, there is the notion of a tuple, such as (1,2,3). Also, there is an enumeration of quoted strings with or without an IN operator attached to it. These blocks are then combined with various keywords, such as ORDER, OPTIMIZE, FROM, etc.

Num TupleList→Num TupleList, Number|Number
Num Tuple→(Num TupleList)
TupleList→TupleList, Exp|Exp
Tuple→(TupleList)
Order→ORDER Tuple
Opt→OPTIMIZE Num Tuple Tuple
XAdv→XADVANCE Tuple|ε
Size→SIZE Num Tuple
Elem→"String"
Elems→Elem|Elems, Elem
From→FROM Elems
InElem→"String" IN Num Tuple
InElems→InElem|InElems, InElem
From In→FROM InElems A declaration body can be named, as in INTERGER χ5;, or unnamed, as in TYPE INTERGER 5;. In this example of one embodiment, a declaration starts with a virtual file name that is enclosed by % signs. After that, precisely one unnamed declaration follows. In the event of a declaration of TYPE STRUCT;, one or more named declarations follow.

IntBody→Number Att Comm;
StringBody→"String" Att Comm;
BagBody→From Att Comm;
SetBody→Size FromIn Att Comm;
KnapsackBody→Order XAdv Opt Size FromIn Att Comm;

Here are unnamed declarations.

IntDecl⇒INTERGER IntBody
StringDecl⇒STRING StringBody
BagDecl⇒BAG BagBody
SetDecl⇒SET SetBody
KnapsackDec⇒KNAPSACK Kanpsack Body
Here are named declarations.
NIntDecl⇒INTERGER Id IntBody
NStringDecl⇒STRING Id StringBody
NBagDecl⇒BAG Id BagBody
NSetDecl⇒SET Id SetBody
NKnapsackDecl⇒KNAPSACK Id Knapsack Body
NIncDecl⇒INCLUDE Id "String";
NValueDecl⇒VALUE Id Expression Global Att Comm;
N D e c l
⇒NIntDecl|NKnapsackDecl|NValueDecl|NIncDecl
A series of named declaration is part of a struct type.
NDecls⇒NDecl|NDecl NDec|
To specify the declaration itself, we now only need two rules:
DeclBody⇒IntDecl|StringDecl|BagDecl|SetDecl
Decl⇒KnapsackDecl|STRUCT Att Comment; NDecls
Declaration⇒% String % TYPE DeclBody A start symbol File generates a syntactically legal HDL program which is stored in a ASCII file with extension .hdf (Hardware Description File). The specific file extension is not important; "hdf" is used for illustrative purposes only
File⇒Declaration|File Description It is now possible to describe trees and collections of trees formally. In order to do this, notation and operations on collection of trees need to be specified. The first definition defines a notation of an ordered sequence.

DEFINITION 1:

Given a countable set $S=\{s_1, \ldots\}$ of elements, we call a sequence $s_{i1}, \ldots, s_{ik}$ of those elements where $i_1, \ldots i_k \in \mathbb{IN}$ an ordered collection of elements or BAG and we will denote it as $<s_{ik}, \ldots, s_{in}>$. The set of all bags of size k are denoted $B_k(S)$. The union of all $B_k(S)$ is called $B(S)$, or even shorter B.

In order to manipulate the bags, it is necessary to define some operations on the bags. The following definitions specify five possible operations on bags, including ways to count, combine, and sum bags.

DEFINITION 2:

1. A Size operator, η:

$$|<x_1, \ldots, x_n>|=\eta$$

2. A Concatenation operator, ⊕:

$$<a_1, \ldots, a_n> \oplus <b_1, \ldots, b_m> = <a_1, \ldots, a_n, b_1, \ldots, b_m>$$

3. An Inner product operator, ⓧ:

$$<a_1, \ldots, a_n> \otimes <b_1, \ldots, B_m> = <<a_1,b_1>, \ldots, <a_1,b_m>, \ldots, <a_n,b_1>, \ldots, <a_nb_m>>$$

This binary operator can be generalized to the n-ary use. Given a bag b,-fold application can be denoted: $b \otimes \ldots \otimes b$ as $b^n$. Given a bags B, all n-fold Products are denoted:
$[2^B]_n$ and their union $2^B$.

4. An outer product operator, x:

$$<a_1, \ldots, a_n> \times <b_1, \ldots, b_n> = <(a_1b_1), \ldots, (a_nb_n)>$$

Note that for an outer product operator to be appropriate both bags to have the same number of elements.

5. For bags of integers B(Z), the sum operator, Σ:

$$\sum <a_1, \ldots, a_n> = \sum_{i=1}^{n} a_i.$$

6. A Filtering operator, using set theoretic notation:

$$B'=<x \in B | x>5>$$

This expression indicates that all elements x greater than 5 are removed from bag B to create a new bag B'.

Next, the notion of a tree with branches that are tagged is inductively defined.

DEFINITION 3:

Given a countable set S of leaf elements and a countable set T of tags, then:
1. x∈T if x∈S
2. $<(t_1,x_1), \ldots, (t_n,x_n)> \in T$ if $x1, \ldots, X_n \in T$ and $t_1, \ldots, t_n \in T$.
3. No other element is in T.
T(S,T) is denoted as the set of tagged trees relative to S and T, or T for short.

Furthermore, a partial function, α, is inductively defined as:

$$\alpha: B(T) \times T(S,T) \rightarrow B(S):$$

This next definition captures the notion of selecting a subset of leaves in a tree along a given path.

DEFINITION 4: Selecting the leaves of a tree.

1. If $a=<(t_1,a_1), \ldots, (t_n,a_n)>$ and $t=<x,y, \ldots>$ with $x=t_I$ for some $I \in \mathbf{I} \subseteq \{1, \ldots, m\}$, then $$\alpha(t, a) = \bigoplus_{i \in T} \alpha(<y, \ldots>, a_i)$$

2. If $a=<(t_1,a_1), \ldots, (t_n,a_n)>$ and $t=<x, \ldots>$ with $x \neq t_I$ for all $i \in \{1, \ldots, n\}$, then $$\alpha(t, a) = \bigoplus_{i \in \{1, \ldots m\}} \alpha(t, a_i)$$

In the event any of those operands are undefined, the result would be undefined.

3. If a∈S and t=, then α(a,t)=a.
4. In all other cases, α is undefined.

Using notation defined above, it is now possible to give the meaning of the different statements that HDL describes. The idea is to incrementally construct the following mapping:

$$\tau: \Sigma^* \rightarrow B(T^*(\Sigma^*, \Sigma^* \cup Z))$$

In words, "set of bags of trees using words as labels and words or integers as leaves." Here, Σ is the set of all words over the HDL alphabet. Each declaration in a HDL file describes one mapping of a word tag to a tagged collection of trees whose leaves are either strings or integers. To achieve this, the following partial function is defined that maps declarations of HDL into a ordered collection of trees:

$$\mu: \Sigma^* \rightarrow B(T^*(\Sigma^*, \Sigma^* \cup Z))$$

Rules can now be assigned to the context free grammar that was defined earlier. In one embodiment of the present invention, this may be formalize as an attributive grammar with synthesized and inherited attributes, but, in this embodiment, a more direct path is taken by rolling some cases into one for the sake of conciseness.

RULE 5: Given $\mu$ and Declaration$\Rightarrow$* % x % y, where x,y$\in$E, $\tau_{new}=\tau_1 \cup (x,\mu(y))$ The next two rules explain language constructs, From and FromIn, which are generated by non-terminals, or branches of a tree.

RULE 6: Given $\mu$ and $\tau$ and From$\Rightarrow$*$\chi$="$\chi_1$", ..., "$\chi_n$", where $x_1, \ldots, x_n \in \Sigma$, then $$\mu_{new} = \mu \cup \left( \chi, \bigoplus_{i=1}^{n} \sigma(\chi_i) \right)$$

RULE 7: Given $\mu$ and $\tau$ and
FromIn$\Rightarrow$*$\chi$="$\chi_1$","$\chi_n$"IN($\alpha_1,b_1$), ...,IN($\alpha_n,b_n$)

where $\chi_1, \ldots, \chi_n \pi \in \Sigma^*$ and $\alpha_1 b_1, \ldots, \alpha_n, b_n \in$IN, define $$B = \bigoplus_{i=1}^{n} \sigma(\chi_i) = <\gamma_1, \ldots, \gamma_m>.$$

For each $\gamma_1$ that originated in $\sigma(\chi_1)$, define $(a^1_j, b_j)=(a_i, b_i)$, Then $B'=<<k_1, \ldots, k_1.\epsilon 2^B | k_1 \leq \leq k_1, \forall m$
$\epsilon\{1, \ldots, 1\}:m\epsilon[a^1_m, a^1_m]>$ Then $\mu_{new}=\mu\cup(\chi_1 B^1)$ Most of the production rules are concerned with an aspect of visualization. The collections of trees described in the following rule by the declaration of TYPE KNAPSACK and TYPE SET are identical.

RULE 8: Given $\mu$ and $\tau$ and KnapsackDec$|\Rightarrow$*$\omega$=$\chi\gamma\gamma'$z or SetDec$|\Rightarrow\chi\omega=\chi\gamma\gamma'$z
where $\gamma$=SIZE($s_1, s_2$)

and $\gamma^1$="$y_1$"IN($a_1, b_1$), ..., "$\chi_n$"IN($a_n, b_n$)

Then $B''=<t\epsilon\mu(y')\|t|\epsilon[S_1, S_2]>$ and $\mu_{new}=\mu\cup(\omega_1 B'')$ The following declaration of type TYPE BAG is based solely on From:

RULE 9: Given $\mu$ and $\tau$ and BagDec$|\Rightarrow\chi\omega\chi\gamma$z, where $y$="$y_1$", ..., "$\gamma_n$"

Then $\mu_{new}=\mu\cup(\omega,\mu(y))$

The meaning of the literals should now be obvious:

RULE 10: Given $\mu$ and $\tau$ and String$\Rightarrow$*$\chi$ or Number$\Rightarrow$*$\chi$, then $\mu_{new}=\mu\cup(I,<I>)$ The following rule defines a STRUCT declaration. Initially, it restricts our meaning of functions to structs that do not contain named VALUE declarations.

RULE 11: Given $\mu$ and $\tau$ and
String$\Rightarrow$*$\omega$=TYPE STRUCT;$t_1 i_1 b_1$; ... $t_n i_n b_n$ under the condition that $t_1, \ldots, t_\pi \in$\{INTERGER, STRING, BAG, SET, KNAPSACK\} and

GNTId$\Rightarrow$*$i_1 | \ldots | i_n$, define $\mu_{new}=\mu\cup(\omega,<i_1, \ldots, i_n>x(\mu(b_1)\otimes \ldots \otimes \mu(b_\pi)))$ Next, the focus is on expressions. Expressions can only be evaluated in the context of a tagged tree T. So far, only a collection of tagged trees has been talked about. The trees can be visualized along a timeline, that is, at each point in time, only one of the trees in a collection will exist. It therefore makes sense to speak of a "current" tree in a collection of trees.

RULE 12: Given a tagged tree T, the following expressions are defined:

1. Using grammatical rules Term$\rightarrow$Id|Term. Id that result in word $I_1.I_2 \ldots I_n$, we will define $\mu_T(I_1.I_2 \ldots I_n)=\Sigma\alpha(<I_1, \ldots, I_n>, T)$
2. From Factor$\rightarrow$Factor * Term that result in word $I_1 * I_2$, define $\mu_T(I_1.*I_2)=\mu_T(I_1)*\mu T(I_2)$
3. From Exp$\rightarrow$Exp +Factor|Exp−Factor that result in word $I_1+I_2$, $I_1-I_2$, define $\mu_T(I_1+I_2)=\mu_T(I_1)+\mu_T(I_2)$ $\mu_T(I_1-I_2)=\mu_T(I_1)-\mu_T(I_2)$ The last gap of the meaning function can now be closed, the named VALUE declaration in TYPE STRUCT:

RULE 13: Given $\mu$ and $\tau$ and String$\Rightarrow$*$\omega$=I VALUE i b, where I=TYPE STRUCT;$t_1 i_1 b_1$; ... $t_n i_n b_\pi$;

and under the condition that $t_1, \ldots, t_\pi \in$\{INTERGER, STRING, BAG, SET, KNAPSACK\} and

Id$\Rightarrow$*$i_1 | \ldots | i_n$, call $\mu_T(I)=<T_1, \ldots, T_m>$ then, $\mu_{new}=\mu U(\omega,<T_1\otimes(t,\mu_{T_1}(b)), \ldots, T_1\otimes(t,\mu_{T_1}(b))>)$ Describing tagged trees is not enough to make HDL useful. The language needs to provide an interface that allows mainstream computer languages such as C++ to interface with the formal objects that are defined in the previous section. Here is a list of queries that may be implemented in a host language to make HDL useful.

1. A facility that implements r or, in other words, given a virtual file name $\eta$, construct the sequence of tagged trees that are associated with it. Since a sequence of trees can be visualized to exist along a timeline, only the first tree needs to be constructed. To get the second, third, etc., the following method is needed.

2. A method to iterate to the successor of the current tree. This also entails a signal when the list of possible tagged trees is exhausted.

3. An evaluator of expressions with regard to a specific tree. Basically, this would be an implementation of the previously defined a function, as well as an arithmetic expression evaluator.

Finally, in the case of a KNAPSACK declaration, there has to be a special query that sets it apart from a SET declaration, for they describe the same set: So far the actual order of the tagged trees is left unspecified. In the case of KNAPSACK, all trees $T=<T_1, \ldots, T_n>$ are ordered according to an expression $I_1$ such that $$\mu_{T_1}(I) \leq \ldots \leq \mu_{T_n}(I)$$

This is reflected in the syntax by giving the keyword ORDER followed by expression I. Furthermore, signs, $S_1, \ldots S_m \epsilon \{-1,1\}$, and expressions, $I_1, \ldots, I_m$, are given by the keyword OPTIMIZE. This induces the following subset of trees:

$$S((s_1,s_2),(a_1,\ldots,a_n))=<t\epsilon T\|t|\epsilon[s_1,s_2],s_1\mu\epsilon(\chi_1)\geq a_1,\ldots,s_n\mu_t(\chi_n)\geq a_n>$$

and queries of the following form are allowed:

$$\text{Find } Y((s_1,s_2),(a_1,\ldots,a_n))=\min \{\mu\_(I)|t\epsilon S((s_1,s_2),(a_1,\ldots,a_n))\}$$

This is essentially a multidimensional range query, for which there are multiple efficient data structures known in the art.

HARDWARE DEFINITION FILES

Given this hardware definition language, hardware definition files can be created that describe a variety of products, including boards, controllers, drive cages, and controller combinations, fits, drives, memory, network interface cards, and the like. Turning to FIGS. 5–24, illustrated are a number of such files.

Turning to FIG. 5, illustrated is a board's hardware description file. This is typical of a number of the remaining hardware description files. Typically, each hardware device has at least a price pertaining to the part, a total price (only different if the part price is a composite), part number, and human readable name. These data items are kept in a global hardware definition file discussed below.

Referring to FIG. 5, the board's hardware description file includes this typical structure, which illustrates part price, part number, and external name.

Turning to FIG. 6, illustrated is a controller's hardware description file. If drive controller redundancy is required, a separate entry will provide for a controller redundant pair, since they act as a logical unit. As can be seen in the controller's hardware description file, drive cages, number of channels, number of internal channels, number of logical controllers, number of physical controllers, number of logical channels, number of PCI slots, part number, external name, are all described.

Turning to FIG. 7, illustrated is the conversion's hardware description file, which is similar to the board's hardware description file of FIG. 5. Again, it provides the basic information of price, part number, and external name.

Turning to FIG. 8, illustrated is a drive cage/controller table that provides stored combinations of parts that be combined in numerous ways. This structure prevents a query according to a primary criteria on any of a number of secondary criteria. Of note, these are further described in concurrently filed application entitled "Method of Developing Physical Requirements for Computer Configuration," especially in the source code appendix. Referring to FIG. 8, as can be seen, number of channels, number of bays, shared channels, fiber channels, and the like are all provided in this drive cage/controller table.

Turning to FIG. 9, illustrated is a drive cage fit file DCFit which is used to describe the fit for a drive cage.

Turning to FIG. 10, shown is a description file which maps part numbers into names.

Turning to FIG. 11, a drive cage file is used to define the attributes of particular drive cages. This includes virtual drive heights, the virtual height of a drive cage, number of channels, plugability, and a variety of other attributes.

Turning to FIG. 12, illustrated is a drives file, which is typically used to define hard drives. The illustrated file includes external name, here a 2.1 GB wide ultra SCSI, attribute such as speed, drive heights, capacity, and related drives.

Turning to FIG. 13, shown is a hubs file which is similar to the board file of FIG. 5.

Turning to FIG. 14, shown is a memory fit file MemFit which is used to define memory modules fit capability.

Turning to FIG. 15, illustrated is a memory module file, which defines attributes of various memory modules, including its external name and capacity.

Turning to FIG. 16, illustrated is a NICFit file which defines the "fit" of network interface cards.

Turning to FIG. 17, shown is a NICs file which is used to define various network interface cards. The illustrated file, for example, is a Netelligent 10/100 TX PCI UTP controller, which provides 10 or 100 base T. It includes bits fields for describing the type of network that it is adapted for, bandwidth, and number of connectors.

Turning to FIG. 18, shown is a part number file, which is similar to the description file of FIG. 10.

Turning to FIG. 19, illustrated is a main file for a server. It defines the number of slots, PCI slots, shared EISA slots, ranking, upgradeability, physical configuration, hot plugability, display, memory, number of slots, price, external name, processor, memory, and slot fits, and availability. These are typically repeated for a variety of other servers.

Turning to FIG. 20, illustrated is a price list file, which is similar to the part number file of FIG. 18.

Turning to FIG. 21, illustrated is a power supply file that is similar to the board file o FIG. 5.

Turning to FIG. 22, illustrated is a processor fit file that defines the configuration of the processor. It includes, for example, the type of processor, the maximum number of processors, speed, and cache size.

Turning to FIG. 23, illustrated is a processor file that defines the attributes of a stand alone processor, such as a Pentium Pro™.

Turning to FIG. 24, illustrated is a slot fit file that defines the configuration for a slot, particularly within a drive cage.

Turning to FIG. 25, illustrated is a file CPQHDW which defines sets of servers, drives, NICs, and a master record to bind the three.

Finally, Turning to FIG. 26, illustrated is a global file which binds together price list, part number, and description.

All of these files are loaded by the sizer framework using the language definitions described above, and employed by the various class and categories described in co-pending entitled "Sizer for Interactive Computer System Configuration" in developing recommended system configurations.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A system for selecting configurations of computer components, comprising:

a general purpose computer executing application software;

a configuration sizer tool that provides a user interface to determine a system configuration for a particular class of computer product in response to user performance and requirement specifications; and a plurality of hardware definition files that specify the performance and configuration characteristics of available components for use by the configuration sizer tool, wherein a hardware definition file of the plurality of hardware definition files specifies a part number and commercial part name for a corresponding component.

2. The system of claim 1, wherein the configuration sizer tool includes a configuration sizer framework and a configuration sizer specific to a particular class of computer products.

3. The system of claim 2, wherein the hardware definition files are associated with the specific configuration sizer.

4. The system of claim 1, wherein the hardware definition files specify the available hard drives.

5. The system of claim 1, wherein the hardware definition files specify the available hard drive cages.

6. The system of claim 1, wherein the hardware definition files specify the available servers.

7. The system of claim 1, wherein the hardware definition files specify the available memory.

8. The system of claim 1, wherein the hardware definition files are specified in a hardware definition language.

9. Computer executable code stored on machine readable media for selecting configurations of computer components, the computer executable code comprising:

a configuration sizer tool that provides a user interface to determine a system configuration for a particular class of computer product in response to user performance and requirement specifications; and a plurality of hardware definition files that specify the performance and configuration characteristics of available components for use by the configuration sizer tool;

wherein a hardware definition file of the plurality of hardware definition files specifies a part number and commercial part name for a corresponding component.

10. The computer executable code of claim 9, wherein the configuration sizer tool includes a configuration sizer framework and a configuration sizer specific to a particular class of computer products.

11. The computer executable code of claim 10, wherein the hardware definition files are associated with the specific configuration sizer.

12. The computer executable code of claim 9, wherein the hardware definition files specify the available hard drives.

13. The computer executable code of claim 9, wherein the hardware definition files specify the available hard drive cages.

14. The computer executable code of claim 9, wherein the hardware definition files specify the available servers.

15. The computer executable code of claim 9, wherein the hardware definition files specify the available memory.

16. The computer executable code of claim 9, wherein the hardware definition files are specified in a hardware definition language.

17. A method of selecting system configuration comprising the steps of:

providing a configuration sizer tool to develop recommended configurations for a class of products in response to performance and requirement specifications from a user;

reading a plurality of hardware definition files defining component characteristics for the configuration sizer tool;

calculating performance characteristics for candidate systems that satisfy the required performance and requirement specifications of the user; and displaying the candidate systems to the user;

wherein a hardware definition file of the plurality of hardware definition files specifies a part number and commercial part name for a corresponding component.

* * * * *